June 11, 1963  A. R. VAIL  3,093,023
TOOL FOR CUTTING FLEXIBLE CONDUIT
Filed Jan. 28, 1960
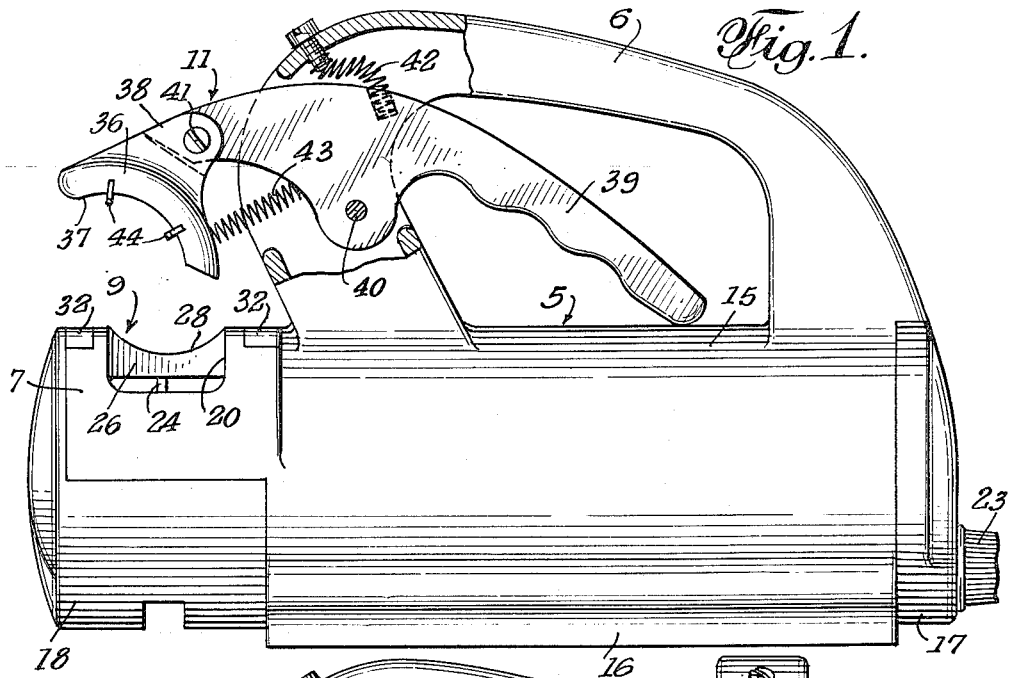
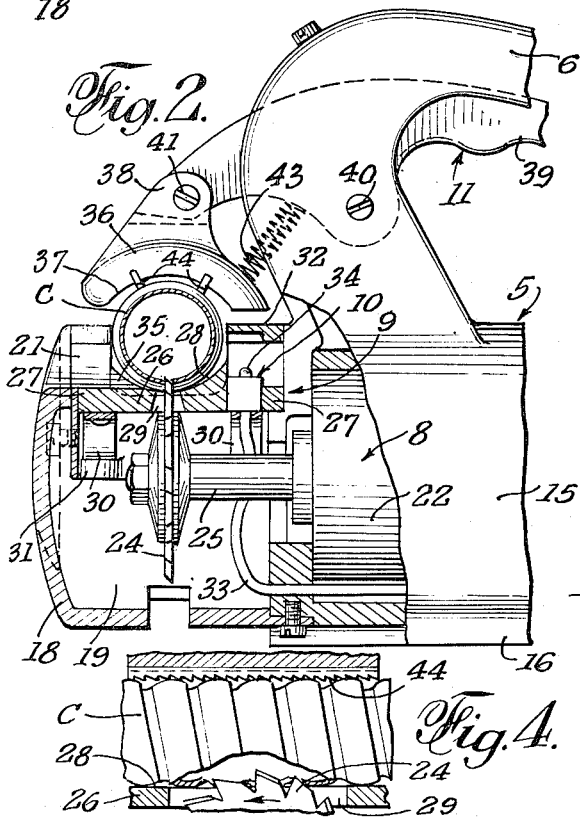
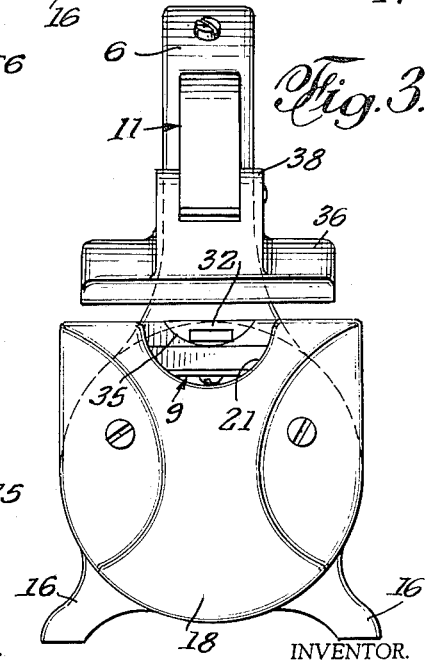
INVENTOR.
ANDE R. VAIL
BY C. F. Stratton
ATTORNEY

United States Patent Office 3,093,023
Patented June 11, 1963

3,093,023
TOOL FOR CUTTING FLEXIBLE CONDUIT
Ande R. Vail, Sherman Oaks, Calif., assignor to William
H. Myers and Elizabeth R. Myers, Los Angeles, Calif.
Filed Jan. 28, 1960, Ser. No. 5,181
7 Claims. (Cl. 83—370)

This invention relates to a tool for cutting flexible conduit such as used for enclosing electric wires.

An object of the present invention is to provide a tool of the character referred to that is set into operation simultaneously with clamping of conduit in operative position in the tool.

Another object of the invention is to provide a tool, as above, that has a single manual controller that acts to clamp a conduit and set the cutting means of the tool in operation simultaneously or in such rapid sequence that conduit cutting is rendered rapid and facile.

A further object of the invention is to provide a cutting tool, as indicated, that stops operation of the cutter thereof upon release of the means that clamps a conduit in the tool.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description and which is based on the accompanying drawing. However, said drawing merely shows, and the following description merely describes, one embodiment of the present invention, which is given by way of illustration of example only.

In the drawing, like reference characters designate similar parts in the several views.

FIG. 1 is a side elevational view, partly broken to show detail, of a tool for cutting flexible conduit, the view showing the tool in open position.

FIG. 2 is a broken vertical sectional view of said tool in conduit-clamping and -cutting position.

FIG. 3 is a front or end elevational view of the tool in the position of FIG. 2.

FIG. 4 is a fragmentary sectional view showing a conduit-clamping detail of the invention.

The conduit-cutting machine that is illustrated comprises, generally, a housing 5 integrally provided with a fixed handle 6 and provided with an end extension 7 forward of said handle, conduit-cutting means 8 disposed within said housing, a movable support 9 for a length of flexible conduit C and mounted in the housing extension 7, a switch 10 in the electrical circuit of the means 8 to control operation of the latter and controlled by movement of the support 9, and means 11 to clamp a conduit C on the support 9 and to simultaneously move the support and a conduit thereon into position for the means 8 to cut into the conduit.

The housing 5 is shown as an elongated, generally tubular body 15 that is provided with support feet 16 that serve to hold the tool upright in use. Said body is provided with a closure plate 17 giving access to the interior of the body for assembly therein of the means 8. The body is preferably formed as a metal molding or casting with the handle 6 integrally formed as a loop capable of being grasped by the hand.

The extension 7 of the housing 5 may include a removable closure part 18 to give access to the interior 19 which houses the cutting portion of the means 8. Said extension 7 is provided with a transverse top-open passage 20 that opens on the interior 19 and with a centrally disposed half-round recess 21 that intersects said passage.

The means 8 is shown as an electric motor 22 longitudinally disposed in the body 15 and which may be energized by electric current connected from a source by a plug 23. Said means 8 further comprises a rotary cutter 24 on the end of the rotor shaft 25 of the motor 22. The disposition of the parts is such that the shaft is on the axial center of the body 15 with the cutter transversely disposed in interior 19 with the teeth thereof extending partly into the passage 20 of the housing extension 15.

The movable support 9 comprises a block 26 that is slidably fitted in the passage 20 to move in said passage in a plane transverse to the plane of cutter 24, said block 26 being provided with extensions 27 that are guided in the housing extension 7. A concave seat 28 is formed in said block to accommodate a length of flexible conduit C, as in FIGS. 2 and 4, so that said conduit is in a transverse position to the axis of shaft 25 and body 15 and in position to be cut into by the cutter 24, the cut, thereby, being longitudinal. The block 26 is provided with a slot 29 into which the teeth of cutter 24 extend so the same may reach a conduit disposed in the seat 28 of said block.

Said block 26 is biased in a direction away from the cutter 24 by springs 30 that are indicated as bowed leaf springs having their ends engaged with abutment lugs 31. When the block is thus held resiliently raised against the limiting bars 32, the bottom of the seat 28 is raised above the periphery of the cutter 24, as shown in FIG. 1. Only upon depression of the block against the bias of springs 30, will the cutter teeth extend through slot 29 into cutting engagement with a conduit disposed in seat 28.

The switch 10 is connected as by wires 33 in the circuit of motor 22. In this case, said switch is carried by one of the extensions 27 of the block 26 and is a normally closed switch that is maintained open when the block is fully raised by springs 30 because the actuator 34 thereof is depressed by the limiting bar 32 thereabove. Upon depression of block 26, the switch automatically closes to energize the motor 22 and cause cutting rotation of the cutter 24. It will be clear that said switch will be just as effective if the same were carried by the body extension 7 and the actuator thereof engaged by a portion of the block 26 to open the same.

It will be noted from FIGS. 2 and 3 that the block 26 is provided with a centrally disposed recess 35 that enables introduction of the end of a piece of conduit transversely into seat 28, said recess cooperating with the recess 21 in the body extension 7 to accommodate the end of a flexible conduit so the cutter 24 may cut transversely thereinto.

The conduit clamping means 11 is shown as comprising a pressure shoe 36 that has a concave seat 37 and is provided with an apertured ear 38, an operating lever 39 that is pivoted at 40 to the handle 6 and has an end pivot 41 connected to the ear 38, a spring 42 to bias the lever 39 in a direction to raise the shoe 36 away from a conduit on the seat 28, and a spring 43 to bias the shoe 36 in a direction to readily engage over a conduit.

It will be seen that upon placing of a conduit on the block 26, the same may be simultaneously clamped by the shoe 36 and the block and conduit depressed, as in FIG. 2, to allow the cutter 24 to make a longitudinal cut in said conduit as the motor 22 is energized upon closing of the switch 10.

As shown, means is provided to counteract endwise movement of the conduit during cutting. Said means is shown as toothed bars 44 carried by the shoe to have longitudinal engagement with the conduit. The teeth of said bars are directed to bite into the conduit against such endwise movement as may be imparted by the cutter.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description and which is based on the accompanying drawing. However, said drawing merely shows, and the following description merely describes, one embodiment of the present invention, which is given by way of illustration or example only.

Having thus described my invention, what I claim and desire to secure by Letters Patent is:

1. A tool for cutting flexible conduit comprising a housing having a handle, a motor-driven cutter carried within the housing, a support for a length of flexible conduit guided in said housing to move between a position away from the cutter and a position wherein the cutter cuts into the conduit, manual means to simultaneously clamp the conduit on the support and move the conduit and support from the mentioned away position to conduit-cutting position, and a self-closing switch controlled by movement of the support to control the motor, said switch being held open in the mentioned away position and closing to energize the motor upon movement of the support toward conduit-cutting position.

2. A tool for cutting flexible conduit comprising a housing having a handle, a motor-driven cutter carried within the housing, a support for a length of flexible conduit guided in said housing to move between a position away from the cutter and a position wherein the cutter cuts into the conduit, manual means to simultaneously clamp the conduit on the support and move with conduit and support from the mentioned away position to conduit-cutting position, and a self-closing switch carried by the support and held open by a portion of the housing when the support is in said away position and closing to energize the motor upon movement of the support toward conduit-cutting position.

3. A tool according to claim 1 in which the manual means includes a pivotally movable pressure shoe that engages over the conduit.

4. A tool according to claim 1 in which the manuel means includes a pivotally movable pressure shoe that engages over the conduit, said shoe having a concave seat, and serrated bar means extending from the surface of said seat into engagement with a conduit, the serrations being directed to counter tendency for endwise slippage of the conduit during cutting.

5. A tool for cutting flexible conduit comprising a rotary cutter, a conduit support, means normally biasing the support in a direction to hold a conduit in spaced relation to said cutter, a single manual means to successively clamp a conduit on the support and move the support and the conduit against said biasing means in a first direction toward the cutter to enable the cutter to cut into the conduit, a motor to operate the cutter, an electric circuit for controlling the operation of said motor, switch means for controlling the energization of said electric circuit, said switch means having an actuator disposed in the path of movement of said conduit support in said first direction whereby movement of said support in response to said manual means will cause said switch means to energize said electric circuit to operate said motor.

6. A tool according to claim 5 in which is provided means to hold the conduit against endwise movement during cutting thereof.

7. A tool for cutting flexible conduit comprising a housing having a handle, a motor-driven cutter carried within the housing, a support for a length of flexible conduit received in guides provided in an opening in said housing, means biasing said support into a first position in said opening away from said cutter, said support having an opening therein through which said cutter may pass into cutting engagement with said conduit as said support is moved in said guides to a second position, single manual means having a surface cooperating with said support for clamping said flexible conduit and a movable lever for simultaneously moving said surface into clamping engagement with said flexible conduit and moving said support against said biasing means from said first position to said second position, said lever being positioned adjacent said handle whereby the handle and lever may be simultaneously gripped and drawn together by an operator's hand to clamp said conduit and move said support carrying said conduit to said second position permitting said cutter to make cutting contact with said conduit through said opening in the support, a switch connected in the power supply circuit of said motor mounted for movement with said support, and an actuator on said switch engaging said housing when said support is disposed in said first position to open said switch and being moved free from engagement with said housing when said support is being moved to said second position to close said switch and thereby actuate said motor to operate said cutter.

References Cited in the file of this patent

UNITED STATES PATENTS

| | | |
|---|---|---|
| 1,430,681 | Pierce | Oct. 3, 1922 |
| 1,996,373 | Hardy | Apr. 2, 1935 |
| 2,176,646 | Thatcher | Oct. 17, 1939 |
| 2,272,215 | Lockett | Feb. 10, 1942 |
| 2,525,588 | Cameron | Oct. 10, 1950 |
| 2,731,085 | Broden | Jan. 17, 1956 |

FOREIGN PATENTS

| | | |
|---|---|---|
| 698,231 | Great Britain | Oct. 14, 1953 |